United States Patent [19]
Garman

[11] 4,159,751
[45] Jul. 3, 1979

[54] SUSPENSION SYSTEM FOR TANDEM AXLE VEHICLES

[75] Inventor: James A. Garman, Eureka, Ill.

[73] Assignee: Caterpillar Tractor Co., Peoria, Ill.

[21] Appl. No.: 787,817

[22] Filed: Apr. 15, 1977

[51] Int. Cl.² .............................................. B62A 61/10
[52] U.S. Cl. ...................... 180/22; 280/91; 280/676
[58] Field of Search .................. 280/679, 91, 676; 180/22

[56] References Cited
U.S. PATENT DOCUMENTS

| 2,346,164 | 4/1944 | Holmstrom et al. ................ 180/22 |
| 2,879,076 | 3/1959 | Stricker, Jr. ........................ 280/676 |
| 3,977,693 | 8/1976 | Gamaunt ............................. 280/91 |

Primary Examiner—Richard A. Bertsch
Attorney, Agent, or Firm—James R. Bell

[57] ABSTRACT

A suspension system for tandem axle vehicles includes resilient suspension members connected between torque arm members and suspension arm members. The torque arm members are interconnected by a torsion equalizer member.

5 Claims, 3 Drawing Figures

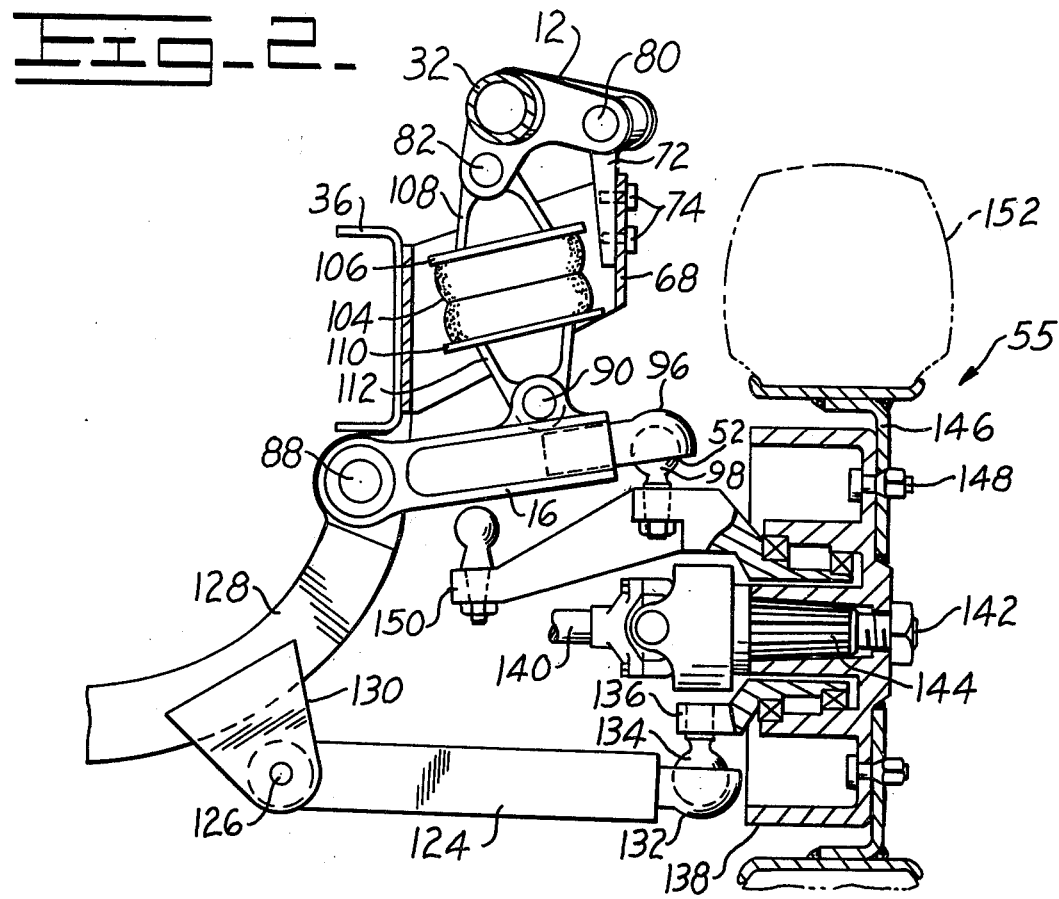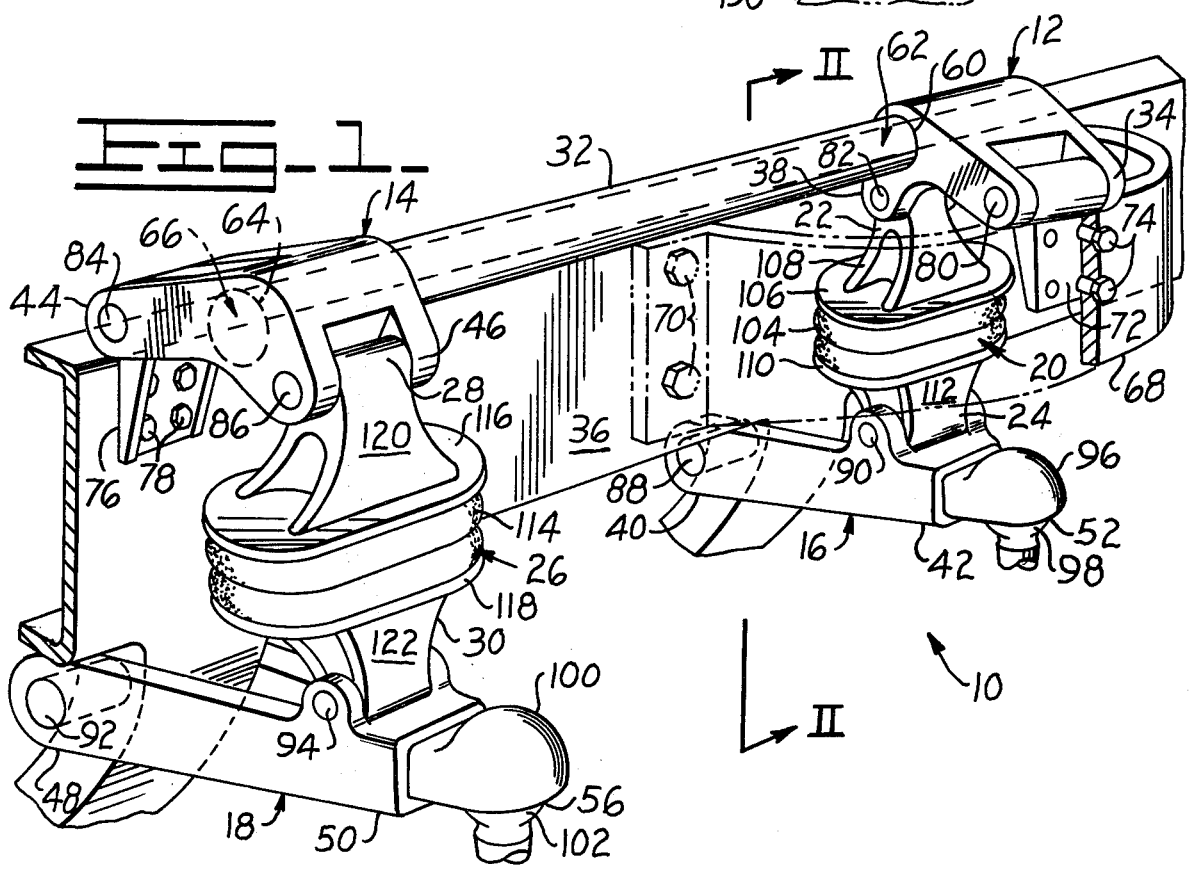

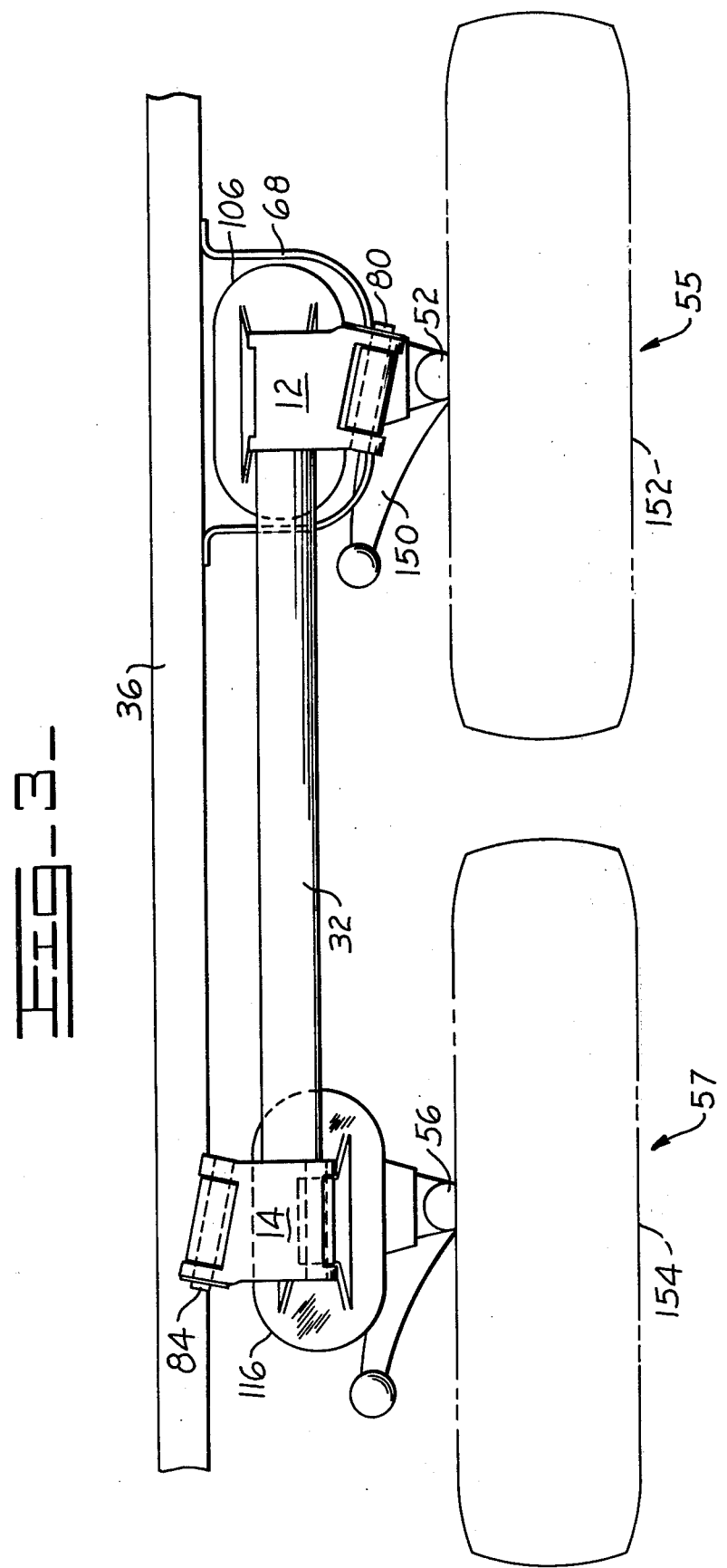

SUSPENSION SYSTEM FOR TANDEM AXLE VEHICLES

BACKGROUND OF THE INVENTION

1. Field of the Invention

This invention relates generally to land vehicles and more particularly to those of the wheeled type having tandem axles.

2. Description of the Prior Art

Presently, suspension systems for tandem axle vehicles advantageously use an equalizer beam for transferring loads between the tandem axles. However, on vehicles with steerable tandem axles, the space normally occupied by the equalizer beam interferes with the tires during the turning mode. Thus steerable tandem axles are not satisfactorily provided with a suitable equalizer mechanism due to space limitations.

In view of the above, it would be advantageous to provide a suitable equalizer mechanism for tandem axles and particularly adaptable for steerable tandem axles which avoids the presently known space limitations and which overcomes the problems associated with the prior art.

SUMMARY OF THE INVENTION

The present invention is directed to overcoming one or more of the problems as set forth above.

According to the present invention this is accomplished by providing an equalizer mechanism comprising a suspension system for tandem axle vehicles including a first resilient suspension member pivotally connected between a first torque arm member and a first suspension arm member. A second resilient suspension member is also pivotally connected between a second torque arm member and a second suspension arm member. The torque arm members are fixedly interconnected by a torsion equalizer member.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is an isometric view illustrating the suspension system of this invention;

FIG. 2 is a cross-sectional view taken along the line II—II of FIG. 1; and

FIG. 3 is a partial plan view illustrating the suspension system of this invention.

BRIEF DESCRIPTION OF THE PREFERRED EMBODIMENT

Referring now to the drawings, the Figures illustrate the suspension system of this invention generally designated 10. The system includes first and second torque arm members 12,14 and first and second suspension arm members 16,18. A first resilient suspension member 20 has a torque end 22 pivotally connected to first torque arm 12 and a suspension end 24 pivotally connected to first suspension arm 16. A second resilient suspension member 26 has a torque end 28 pivotally connected to the second torque arm 14 and a suspension end 30 pivotally connected to the second suspension arm 18. A torsion equalizer member 32 is fixedly interconnected between first and second torque arm members 12,14, respectively. First torque arm 12 has a first end 34 pivotally connected to an associated frame 36 of the vehicle and a second end 38 pivotally connected to the torque end 22 of the first resilient suspension member 20. First suspension arm 16 has a first end 40 pivotally connected to frame 36 and a second end 42 pivotally connected to the suspension end 24 of the first resilient suspension member 20. Second torque arm 14 has a first end 44 pivotally connected to frame 36 and a second end 46 pivotally connected to the torque end 28 of the second resilient suspension member 26. Second suspension arm 18 has a first end 48 pivotally connected to frame 36 and a second end 50 pivotally connected to the suspension end 30 of the second resilient suspension member 26. First suspension arm 16 has its second end 42 ball and socket connected at 52 to a first associated wheel 152 (FIGS. 2,3) of the vehicle. Second suspension arm 18 has its second end 50 ball and socket connected at 56 to a second associated wheel 154 of the vehicle. The fixed connection at 60 (FIG. 1) between the first end 62 of torsion equalizer member 32 and the first torque arm member 12 is spaced from the first and second pivotally mounted ends 34,38, respectively, of the first torque arm member 12. The fixed connection at 64 between the second end 66 of torsion equalizer member 32 and the second torque arm member 14 is spaced from the first and second pivotally mounted ends 44,46, respectively, of the second torque arm member 14.

More specifically, a frame portion 36, FIG. 1, of a tandem axle vehicle preferably includes a rolled steel extension member 68 fixedly attached to frame 36 by bolts 70. A first torque arm bracket 72 is fixedly attached to bracket 68 by bolts 74 and a second torque arm bracket 76 is fixedly attached to frame portion 36 by bolts 78. The torque arm brackets and bolts are preferably of a suitable steel.

First torque arm member 12 is preferably or forged steel and is generally "L"-shaped including first end 34 pivotally connected to frame 36 via extension 68 and bracket 72 at pin 80. Second end 38 is pivotally connected to torque end 22 of suspension member 20 at pin 82. Similarly, first end 44 of second torque arm member 14 is pivotally connected, at pin 84, to bracket 76 mounted on frame 36. Second end 46 is pivotally connected to torque end 28 of suspension member 26 at pin 86. As best shown in FIG. 3, pins 80 and 84 are preferably coaxial so that first and second torque arms 12,14, respectively, pivot about a common axis relative to frame 36.

Torsion equalizer member 32, FIGS. 1, 2 and 3, is preferably an elongated rolled steel tube having a first end 62 fixedly connected at 60 to first torque arm 12 and a second end 66 similarly connected at 64 to second torque arm 14. The fixed connection at 60 is spaced at a first distance from the pivotal connection at pin 80 at the first end 34 of torque arm 12. Similarly, the fixed connection at 64 is spaced at a distance substantially equal to the first distance from the pivotal connection at pin 84. The fixed connection at 60 is spaced at a second distance from the pivotal connection at pin 82 at the second end 38 of torque arm 12 and, similarly, the fixed connection at 64 is spaced at a distance substantially equal to the second distance from the pivotal connection at pin 86.

First suspension arm 16, FIGS. 1 and 2, is preferably a forged steel member and has a first end 40 pivotally connected to frame 36 by pin 88. The second end 42 is pivotally connected to suspension end 24 of first resilient member 20 at pin 90. Similarly, second suspension arm 18 has first end 48 pivotally connected to frame 36 by pin 92 and second end 50 pivotally connected to suspension end 30 of second resilient member 26 at pin 94. Preferably pins 88,92 are coaxially aligned so that first and second suspension arms 16,18 pivot about a common axis relative to frame 36. Further, first suspension arm 16 includes a socket extension 96 downwardly facing as viewed in the drawings for engagement with a mating ball 98. In this manner, suspension arm 16 is ball and socket connected at 52 to first wheel 152, to be discussed later in greater detail. Similarly, second suspension arm 18 includes a socket extension 100 downwardly facing as viewed in the drawings for engagement with a mating ball 102. Thus, suspension arm 18 is ball and socket connected at 56 to second wheel 154.

First resilient suspension member 20, FIGS. 1 and 2, comprises a resilient center or mid-portion 104 preferably of a suitable rubber material. This mid-portion is preferably bonded at its opposite ends preferably to steel plates. Upper steel plate 106 preferably has a forged steel upper "A" frame member 108 attached thereto preferably by welding. Upper "A" frame member 108 comprises torque end 22 of suspension member 20 and is pivotally connected, at pin 82, to first torque arm 12. Similarly, lower steel plate 110 includes lower "A" frame member 112 and comprises suspension end 24 pivotally connected, at pin 90, to first suspension arm member 16. In a similar manner, second resilient suspension member 26 includes resilient center portion 114 bonded to upper and lower steel plates 116,118, respectively. Upper "A" frame member 120 is pivotally connected, via pin 86 at its torque end 28, to second torque arm 14 and lower "A" frame member 122 is pivotally connected, via pin 94 at its suspension end 30, to second suspension arm 18.

A lower support arm 124, FIG. 2, preferably of a suitable forged steel similar to suspension arm 16, is pivotally mounted, at pin 126, to a portion 128 of frame 36 via bracket 130. Socket extension 132 extends from support arm 124 for mating engagement with ball 134. Ball 98 and ball 134 are mounted on annular wheel insert 136 which, in turn, is bearing mounted in annular wheel hub 138. An axle 140 is typically mounted in hub 138 via bolt 142 secured to an interconnecting axle spindle 144. A wheel rim 146 is mounted on hub 138 via bolts 148 in the usual manner, and, typically, a tire 55, shown in phantom outline, is mounted on rim 146. A steering arm 150 extends from wheel insert 136 for operable connection to steering connecting rods, not shown. Only one wheel 152, including tire 55, is described in detail although the tandem system of this invention includes wheel 154 including tire 57 shown in phantom outline.

Operation

Forces deflecting wheel 152 are transmitted to suspension arm 16 via the ball and socket connection at 52. These forces are further transmitted through resilient suspension member 20 to torque arm 12 at pivotal connection 82 thus creating a clockwise moment about pin 80 and torsion equalizer member 32. Similarly, forces deflecting wheel 154 act through suspension arm 18, resilient suspension member 26 and torque arm 14 to create a counterclockwise moment about pin 84 and torsion member 32. Thus, the independently suspended wheels 152 and 154 are interconnected by torsion member 32 creating an interacting equalizer mechanism for distributing suspension loading between tandem axles.

The foregoing has described an equalizer mechanism such as a suspension system for tandem axles which is particularly advantageous since this system avoids heretofore known space limitations associated with suspension systems in steerable tandem axles. This system incorporates an equalizer mechanism such as a torsion member 32 which operates in a space above the wheels of the tandem axles. Furthermore, this system can be used in non-steerable, driven, or non-driven tandem axles, or any combination thereof.

The embodiments of the invention in which an exclusive property or privilege is claimed are defined as follows:

1. A tandem axle vehicle suspension system, comprising:
   first and second torque arms each having a first end pivotally connected to a frame portion of an associated tandem axle vehicle;
   first and second suspension arms each having a first end pivotally connected to the frame;
   a first resilient suspension member having a torque end pivotally connected to a second end of the first torque arm and having a suspension end pivotally connected to a second end of the first suspension arm, the second end of the first suspension arm being ball and socket connected to a first wheel of the associated vehicle;
   a second resilient suspension member having a torque end pivotally connected to a second end of the second torque arm and having a suspension end pivotally connected to a second end of the second suspension arm, the second end of the second suspension arm being ball and socket connected to a second wheel of the vehicle; and
   a torsion equalizer member fixedly connected to each of the first and second torque arm members.

2. The system of claim 1, wherein:
   the fixed connection between the torsion equalizer member and the first torque arm member is spaced from the first and second pivotally mounted ends of the first torque arm member; and
   the fixed connection between the torsion equalizer member and the second torque arm member is spaced from the first and second pivotally mounted ends of the second torque arm member.

3. A vehicle frame comprising:
   first and second tandem axles mounted on the frame;
   first and second torque arms each having a first end connected to the frame;
   first and second suspension arms each having a first end connected to the frame;
   a first resilient suspension member having a torque end connected to a second end of the first torque arm and having a suspension end connected to a second end of the first suspension arm, the second end of the first suspension arm being connected to the first axle;
   a second resilient suspension member having a torque end pivotally connected to a second end of the second torque arm and having a suspension end pivotally connected to a second end of the second suspension arm, the second end of the second suspension arm being connected to the second axle; and a torsion equalizer fixedly connected to each of the first and second torque arm members.

4. A vehicle comprising:

a frame;

first and second tandem axles mounted on the frame;

first and second torque arms each having a first end connected to the frame;

first and second suspension arms each having a first end connected to the frame;

a first resilient suspension member having a torque end connected to a second end of the first torque arm and having a suspension end connected to a second end of the first suspension arm, the second end of the first suspension arm being connected to the first axle;

a second resilient suspension member having a torque end connected to a second end of the second torque arm and having a suspension end connected to a second end of the second suspension arm, the second end of the second suspension arm being connected to the second axle; and a torsion equalizer fixedly connected to each of the first and second torque arm members.

5. A tandem axle suspension apparatus, comprising:

first and second torque arms each having first and second ends;

first and second suspension arms each having first and second ends;

means for connecting the first end of the first torque arm to a vehicle frame;

means for connecting the first end of the second torque arm to a vehicle frame;

a first resilient suspension member having a torque end connected to the second end of the first torque arm and having a suspension end connected to the second end of the first suspension arm;

a second resilient suspension member having a torque end connected to a second end of the second torque arm and having a suspension end connected to a second end of the second suspension arm;

means for connecting the second end of the first suspension arm to a first axle;

means for connecting the second end of the second suspension arm to a second axle; and a torsion bar fixedly connected to each of the first and second torque arm members.

* * * * *